United States Patent
Aromin et al.

(10) Patent No.: US 9,450,395 B2
(45) Date of Patent: Sep. 20, 2016

(54) MANUAL RESET GROUND FAULT CIRCUIT INTERRUPTOR (GFCI) WITH A QUICK CONNECT LOAD INPUT

(71) Applicants: Victor V Aromin, West Warwick, RI (US); Chepur P. Rao, Swedesboro, NJ (US)

(72) Inventors: Victor V Aromin, West Warwick, RI (US); Chepur P. Rao, Swedesboro, NJ (US)

(73) Assignee: TOWER MANUFACTURING, Providence, RI (US)

( * ) Notice: Subject to any disclaimer, the term of this patent is extended or adjusted under 35 U.S.C. 154(b) by 111 days.

(21) Appl. No.: 14/291,192

(22) Filed: May 30, 2014

(65) Prior Publication Data

US 2015/0009592 A1   Jan. 8, 2015

Related U.S. Application Data

(60) Provisional application No. 61/842,999, filed on Jul. 4, 2013.

(51) Int. Cl.
*H02H 3/00* (2006.01)
*H02H 3/16* (2006.01)
*H02H 3/32* (2006.01)

(52) U.S. Cl.
CPC ............... *H02H 3/162* (2013.01); *H02H 3/32* (2013.01)

(58) Field of Classification Search
USPC .......................................................... 361/42
See application file for complete search history.

(56) References Cited

U.S. PATENT DOCUMENTS

| | | | | |
|---|---|---|---|---|
| 2,644,144 A | * | 6/1953 | Richardson | H01R 33/0827 439/656 |
| 2,944,242 A | * | 7/1960 | Bentley | H01R 24/76 439/441 |
| 4,685,886 A | * | 8/1987 | Denlinger | H01R 13/11 439/374 |
| 4,872,087 A | * | 10/1989 | Brant | H01H 83/04 361/45 |
| 4,921,439 A | * | 5/1990 | Bofill | H01R 12/592 439/417 |
| 5,418,678 A | * | 5/1995 | McDonald | H01H 83/02 335/19 |
| 8,235,748 B2 | * | 8/2012 | Lacey et al. | H02G 3/18 439/502 |
| 2002/0160649 A1 | * | 10/2002 | Blaha | H01R 4/2433 439/417 |
| 2008/0186116 A1 | * | 8/2008 | DiSalvo | H01H 71/62 335/18 |
| 2011/0222195 A1 | * | 9/2011 | Benoit | H01H 1/5866 361/45 |
| 2013/0034988 A1 | * | 2/2013 | Turco | F21V 21/002 439/417 |
| 2014/0368977 A1 | * | 12/2014 | Lenny | H01R 31/065 361/627 |
| 2015/0009592 A1 | * | 1/2015 | Aromin | H02H 3/32 361/42 |
| 2015/0214719 A1 | * | 7/2015 | Aromin | H02H 3/33 361/42 |
| 2015/0214721 A1 | * | 7/2015 | Aromin | H02H 1/0015 361/2 |

* cited by examiner

*Primary Examiner* — Ronald W Leja

(57) ABSTRACT

A Ground Fault Circuit Interrupter (GFCI) interrupts the flow of current through a pair of lines extending between a source of power and a load. The GFCI includes a circuit breaker, a relay circuit including a solenoid, a latch circuit, and a fault detecting circuit packaged in a circuit assembly. The GFCI is adaptable for a quick connect of a load input cord by a user, allowing for various configurations of cords to be utilized on site, the cord easily connected from the device being protected to the GFCI at the point of use. The GFCI circuit assembly includes a load input section having cable securement jaws for connection of the load input cable terminal ends.

11 Claims, 10 Drawing Sheets

MANUAL RESET GROUND FAULT CIRCUIT INTERRUPTOR (GFCI) WITH A QUICK CONNECT LOAD INPUT

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 61/842,999 entitled "A Manual Reset Ground Fault Circuit Interrupter (GFCI) With a Quick Connect Load Input", naming Victor V. Aromin and Chepur P. Rau as inventors, filed 4 Jul. 2013.

FIELD OF USE

The present invention relates generally to electrical safety devices and more particularly to a ground fault circuit interrupter (GFCI) having a connection feature that allows for on-site quick engagement of Load input cords.

DESCRIPTION OF PRIOR ART (BACKGROUND)

Conventional electrical appliances typically receive alternating current (AC) power from a power supply, such as an electrical outlet, through a pair of conducting lines. The pair of conducting lines, often referred to as the line and neutral conductors, enable the electrical appliance, or load, to receive the current necessary to operate.

The connection of an electrical appliance to a power supply by a pair of conducting lines creates a number of potentially dangerous conditions. In particular, there exists the risk of ground fault and grounded neutral conditions in the conducting lines. A ground fault condition occurs when there is an imbalance between the currents flowing in the line and neutral conductors. A grounded neutral condition occurs when the neutral conductor is grounded at the load. A ground fault condition is extremely dangerous and can result in serious injury.

Ground fault circuit interrupters are well known in the art and are commonly used to protect against ground fault and grounded neutral conditions. In general, GFCI devices sense the presence of ground fault and grounded neutral conditions in the conducting lines, and in response thereto, open at least one of the conducting lines between the power supply and the load to eliminate the dangerous condition. In U.S. Pat. No. 5,177,657, to M. Baer et al, there is disclosed a ground limit interrupter circuit which interrupts the flow of current to a pair of lines extending between a source of power and a load. The ground fault interrupter circuit includes a circuit breaker comprising a normally open switch located in one or both of the lines, a relay circuit for selectively closing the normally open switch, an electronic latch circuit operable in first and second bi-stable states and a fault sensing circuit for sensing the presence of a fault condition in at least one of the lines. The electronic latch circuit causes the relay circuit to close the normally open switch and maintain the normally open switch in its closed position when the electronic latch circuit is in the first bi-stable state.

The electronic latch circuit also causes the relay circuit to permit the normally open switch to return to its normally open condition when the latch circuit is in its second bi-stable state. A fault sensing circuit senses the presence of a fault condition in at least one of the lines and causes the electronic latch to latch in its second state upon detection of the fault condition.

In U.S. Pat. No. 5,418,678 to T. M. McDonald, there is disclosed an improved ground fault circuit interrupter (GFCI) device which requires manual setting following initial connection to an AC power source or termination of to power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

In U.S. Pat. No. 4,816,957 to L. F. Irwin there is disclosed an adapter unit comprising a moisture resistant housing within which is carried an improved, self testing ground line fault interrupter device. The improved device is electrically interconnected with a connector carried externally of the adapter housing so that the unit can be plugged directly into a standard duplex outlet of an existing circuit. The apparatus includes circuitry that automatically tests the operability of the device when it is plugged into a duplex outlet without the need for manual manipulation of test buttons or other overt action by the user.

In U.S. Pat. No. 4,578,732 to C. W. Draper et al there is disclosed a wall socket type ground fault circuit interrupter baying a pair of sockets, a reset button and a test button that are accessible from the front of the interrupter. The interrupter has latched snap-acting contacts and a novel latching relay structure for releasably maintaining the snap-acting contacts in a circuit making position. The snap-acting contacts permit all of the components including the monitoring toroids and the power supply to be respectively located and connected at the load side of the snap-acting contacts so that all of the circuits of the interrupter are de-energized when the contacts snap to a circuit opening position. The snap-acting contact mechanism and relay are provided with structures which provide the interrupter with a trip-free mode of contact actuation and accordingly a tease-proof snap-acting contact operation.

One drawback of GFCI devices of the type described above is that the GFCI device generally includes a large solenoid to selectively open and close the switching device. Specifically, the solenoid generally requires a constant supply of line voltage (approximately 120 volts) in order to switch and sustain the solenoid in its energized state. As a consequence, the solenoid acts as a large power drain source. In addition, the constant supply of line voltage to the solenoid causes the solenoid to heat up significantly and potentially burn out.

Moreover, the devices of the type described above do not include a feature for the on-site quick connection of load input cords.

BRIEF SUMMARY

The foregoing and other problems are overcome, and other advantages are realized, in accordance with the presently preferred embodiments of these teachings. In accordance with one embodiment the invention is directed towards a single universal GFCI adaptable for a quick connect of a load input cord by a user. The device may be sold without a load input cord, allowing for various configurations of cords to be utilized on site, the cord easily connected from the device being protected to the GFCI at the point of use. The GFCI circuit assembly including a load input section having cable securement jaws for connection of load input cable terminal ends.

Components and circuit traces mounted and or adhered to the Printed Circuit Board (PCB) of the GFCI are configured to minimize PCB packaging density while simultaneously maximizing distances between component and circuit traces to conform to required safety standards, e.g., UL840, to prevent electric arcing and dielectric breakdown.

The GFCI constructed according to this invention further includes: a circuit breaker having a switch located in one of said lines, said switch having a first position in which the source of power in its associated line is not connected to the load and a second position in which the source of power in its associated line is connected to the load. The switch being in a normally open configuration and prior to use the GFCI having to be manually reset to connect the power to the load, and a relay circuit for selectively moving said switch to said first open position after a manual reset or ground fault, said relay circuit including a solenoid operable in either an energized state or a de-energized state, said solenoid setting said switch in said first open position when in its de-energized state and maintaining said switch in said first open position until manually reset, and a latch circuit operable in first and second bi-stable states, said latch circuit allowing said solenoid to switch from its energized state (first bi-stable state) to its de-energized state (second bi-stable state) and remain in its de-energized state until manually reset, and a fault detecting circuit for detecting the presence of a fault condition in at least one of said lines extending between the power and the load and for causing said latch circuit to latch in its second bi-stable state, allowing said solenoid to switch from its energized state to its de-energized state, upon detection of said fault condition.

The GFCI circuit arrangement further includes movable contact arms that are mechanically biased to keep the contacts in a normally open position. The contact arms may take the form of a contact-carrying bar mounted in a cantilever fashion by flexible supporting legs that provide the bias to a normally open position. An elongated actuating member is arranged to reciprocate adjacent the contact-carrying bar when manually energized through an appropriate push button. When pushed, the actuating member pushes the moveable contact arm ends to engage stationary contact arms thereby connecting the source of power to the load.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
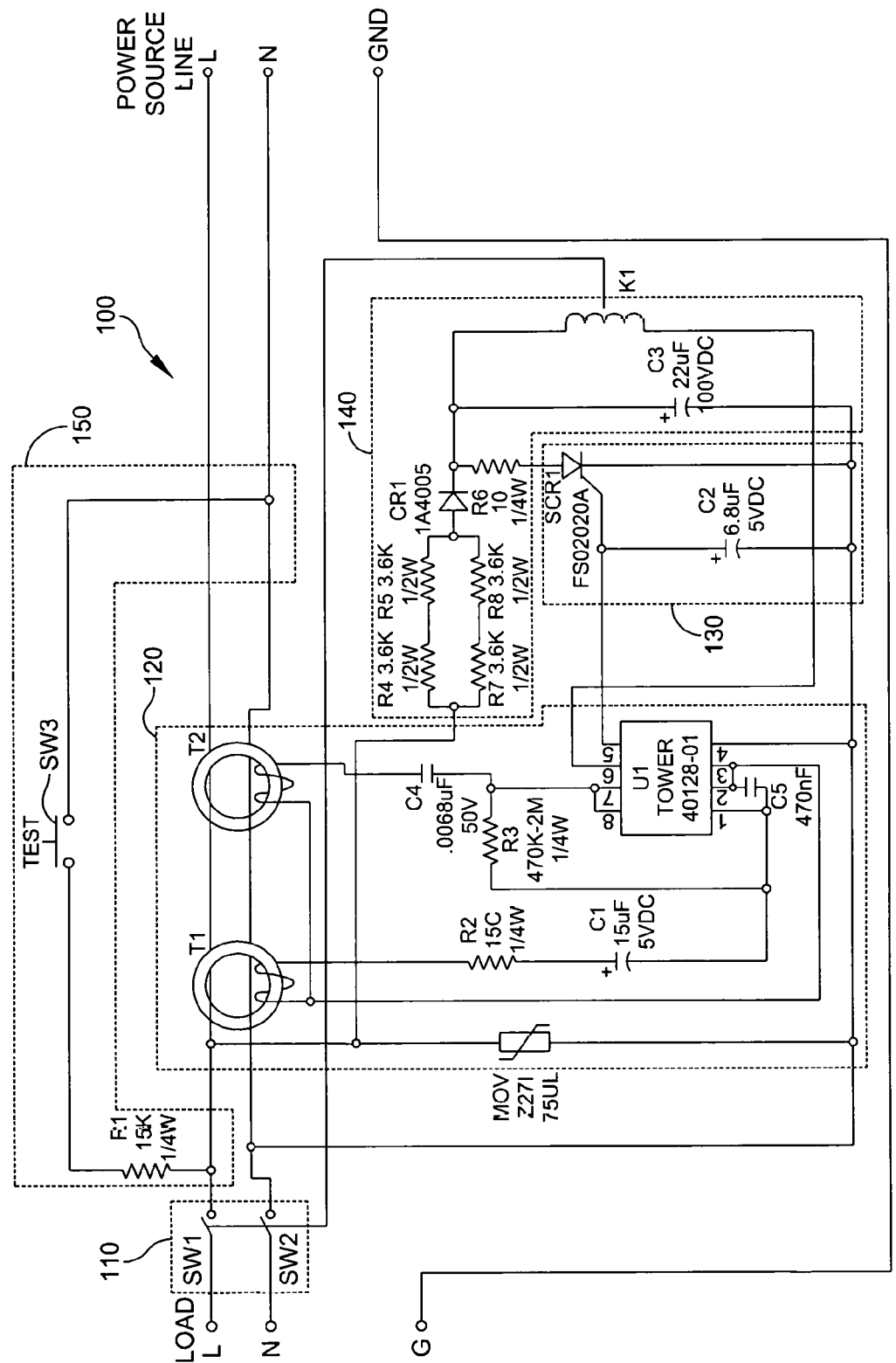
FIG. 1 is a schematic circuit diagram of an embodiment of a ground fault circuit interrupter (GFCI) employing the principles of subject invention as shown in FIG. 2-5.

Referring now to the drawings and more particularly to FIG. 1, there is shown a ground fault circuit interrupter (hereinafter GFCI) circuit schematic of the GFCI constructed according to the teachings of the present invention, the GFCI being represented generally by reference numeral 100. As will be discussed in detail below, GFCI 100, is a manual reset type GFCI circuit, and must be manually set upon connection to a power source to protect a load from ground fault condition. Consequently, upon a ground fault condition, or upon a loss of power to GFCI 100 it can be manually reset to protect against further ground fault conditions.

GFCI 100 includes a circuit breaker 110, a fault detection circuit 120, a latch circuit 130, a relay circuit 140, and a test circuit 150. Circuit breaker 110 includes a pair of single-pole, double-throw switches SW1 and SW2 which are located in the line and neutral conductive lines, respectively, between a power source and a load. Circuit breaker 100 acts to selectively open and close the pair of conductive lines. Switches SW1 and SW2 can be positioned in either of two connective positions. In the first connective position, which is illustrated in FIG. 1, switches SW1 and SW2 are positioned such that the power source is not connected to the load, in a normally open position. In the second connective position, which is the opposite position illustrated in FIG. 1, switches SW1 and SW2 are positioned such that the power source is connected to the load. This condition occurs subsequent to the GFCI being connected to a power source and being manually reset.

Fault detection circuit 120 acts to detect both ground fault and grounded neutral conditions in the conductive lines when switches SW1 and SW2 are in their second connective position. Fault detection circuit 120 comprises a sense transformer T1, a grounded neutral transformer T2, capacitors C1, C4 and C5, resistors R2 and R3 and a ground fault interrupter chip U1. Transformer T1 and T2 are preferably transformers sold by Magnetic Metals Corporation, Camden, N.J. and compatible with Low Power Controller U1.

Low Power Controller U1 is preferably that sold by Fairchild Semiconductor, model No. RV4145A.

Sense transformer T1 senses the current differential between the line and neutral conductive lines, and upon the presence of a ground fault condition, transformer T1 induces an associated output from its secondary windings. Grounded neutral transformer T2 acts in conjunction with transformer T1 to sense the presence of grounded neutral conditions and in turn, induce an associated output. The AC signal from the secondary winding of transformer T1 is coupled to chip U1.

Fault detection circuit 120 further provides the capability to prevent fault detection in response to low level faults, line disturbances, and electrical noise. Circuit 120 acts to set a minimum fault current at which Fault Detection Circuit 120 provides an output to latch circuit 130. Low Power Controller U1 serves to amplify the fault signal generated by transformer T1 and provide an output pulse on pin 5 to activate latch circuit 130.

Latch Circuit 130 acts to take the electrical signal produced by fault detection circuit 120 upon the detection of a ground fault or grounded neutral condition and, in turn, creating a short across solenoid K1 and effectively de-energizing it. Latch circuit 130 comprises a silicon controlled rectifier SCR1 operable in either a conductive or a non-conductive state, and a noise suppression capacitor C2 to prevent narrow pulses from firing the SCR1. In the preferred embodiment, SCR1 has a high dV/dt rating to ensure that line noise does not falsely trigger SCR1, and the SCR1 has a gate drive requirement of less than 200 uF.

Relay circuit 140 acts to selectively position switches S1 and S2 to their first connective positions when a short occurs across K1, thereby indicating a ground fault or ground neutral condition has occurred. Relay circuit 140 comprises a solenoid K1, capacitor C3, resistor R6, silicon rectifier CR1, and Resistors R4, R5, R7, R8. Solenoid K1 is ganged to the circuit breaker contacts of switches S1 and S2 and is responsible for selectively controlling the connective position of switches S1 and S2. Before power is applied to GFCI 100. SW1 and SW2 are in the first connective position, normally open, as illustrated in FIG. 1, where the power source is not connected to the load. Upon power being applied to GFCI 100, SW1 and SW2 still remain in the normally open position. Only after switches SW1 and SW2 are manually reset via a reset switch (not shown) solenoid SOL1 positions switches SW1 and SW2 in their second connective position (closed) and the source is no connected to the load. Switches SW1 and SW2 will remain in their second connective position until either the source of power is removed from GFCI 100 or a ground fault or ground fault neutral condition occurs. A constant voltage of 28 volts is applied to solenoid K1 subsequent to K1 being energized after a manual reset. A voltage divider network of resistors R4, R5, R5, R7, and R8 and silicon rectifier CR1 provide a voltage drop to keep solenoid K1 Energized.

Test circuit 150 provides a means of testing whether circuit 100 is functioning properly. Test circuit 150 comprises a current limiting resistor R1 having a value of 15 Kohms and a test switch SW3 of conventional push-in type design. When SW3 is depressed to energize test circuit 150, resistor R1 provides a simulated fault current to transformer T1 which is similar to a gonad fault condition.

Figure 2:
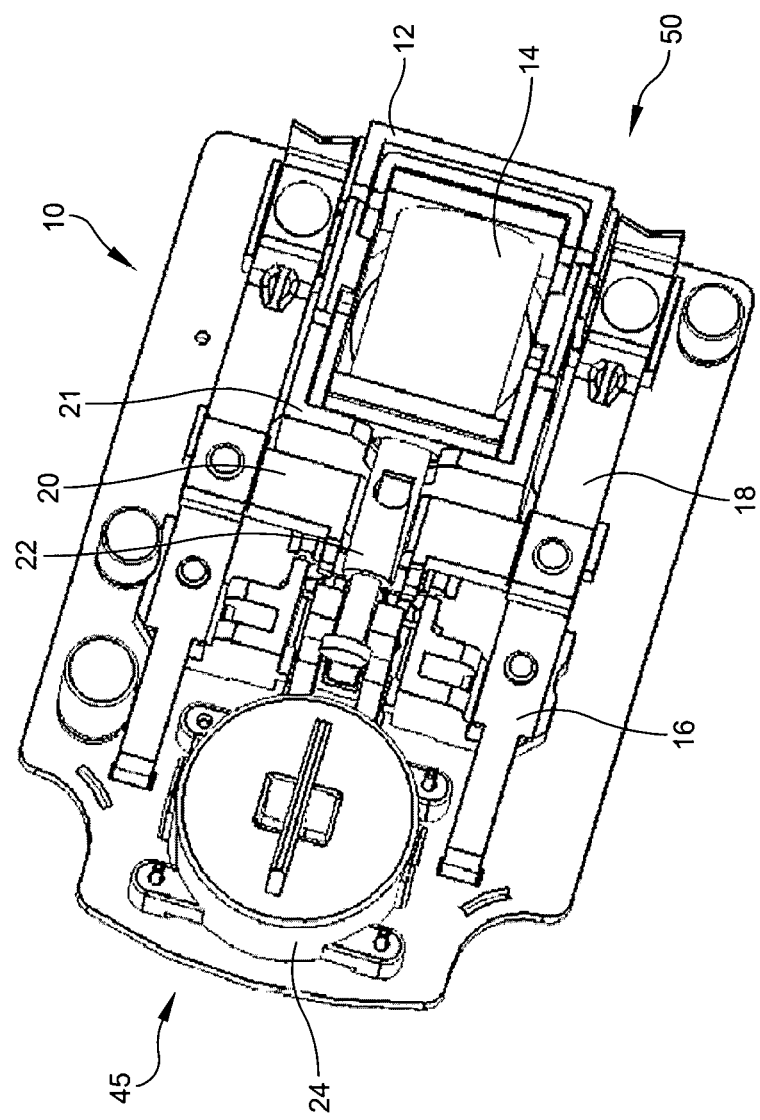
FIG. 2 shows a top plan view of an embodiment of the GFCI employing the principles of subject invention described herein.

Referring, to FIG. 2 there is shown a top plan view of a GFCI Printed Circuit Board (PCB) 10. The GFCI PCB 10 includes solenoid 14 encased in frame 12, plunger 22, moveable contact arms 18, actuating member 20, stationary contact arms 16, and transformer 24. Further dispersed on GFCI 10 are the circuit components as illustrated in FIG. 1.

Figure 3:
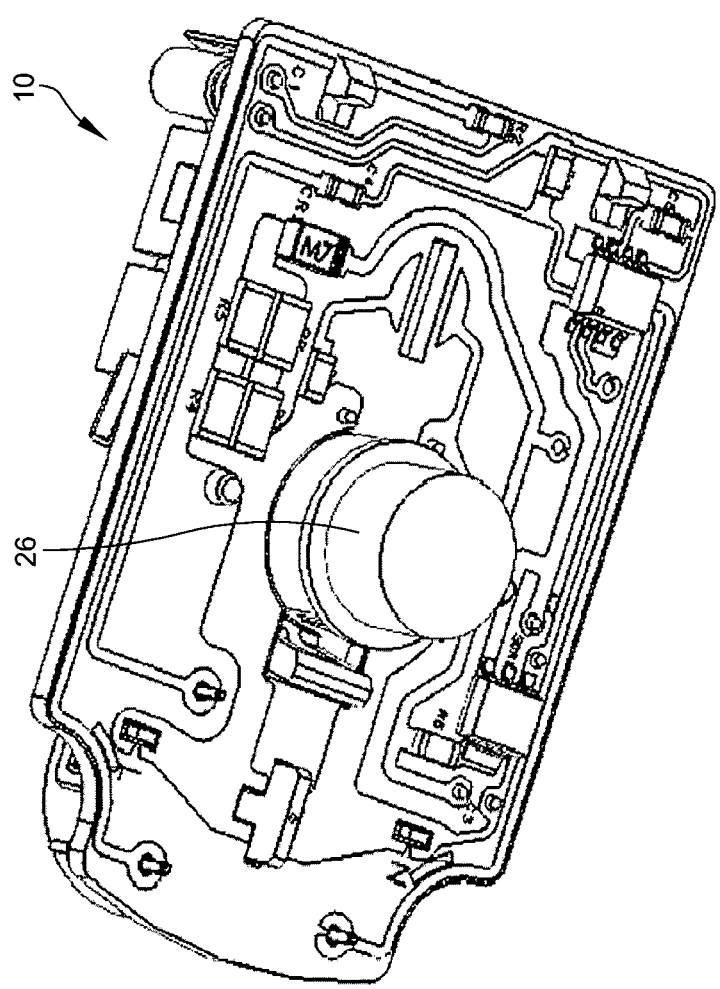
FIG. 3 shows a bottom plan view of the GFCI of FIG. 2 employing the principles of subject invention described herein.

It is understood that the arrangement of the circuit components from FIG. 1 onto the GFCI PCB of FIGS. 2 and 3 can be an arrangement that allows for the quick connect features of the present invention to be arranged on the GFCI PCB 10, and which allows for the minimization of PCB packaging density while simultaneously maximizing distances between component and circuit traces to conform to required safety standards, e.g., UL840, to prevent electric arcing and dielectric breakdown.

In the preferred embodiment, solenoid 14 and frame 12 are positioned at one end of GFCI PCB 10, and transformer 24, encapsulating transformers T1 and T2 are positioned at the opposite can of GFCI PCB 10. Movable contact arms 18 are positioned parallel to each other on opposite sides of frame 12 and extend longitudinally to contact points 18C3 which are movable by actuating member 20 positioned transverse and forward to transformer housing 24. Stationary contact arms 16, having at one end contact point 16A for engagement with contact point 18C3, extend in longitudinal alignment with contact arms 18 in the direction of transformer housing 24, and are positioned parallel to each other on opposite sides of transformer housing 24.

Referring also to FIG. 3 there is shown a bottom plan view of the GFCI PCB package 10. The GFCI PCB 10 includes components mounted on a bottom surface of PCB 10. Also shown in FIG. 3 are surface traces connecting the top and bottom PCB components. It will be appreciated that the components, and circuit traces shown in FIG. 3 are strategically arranged to minimize required spacing while simultaneously maintaining arcing and dielectric breakdown prevention distances between each of the components and surface traces.

Figure 4:
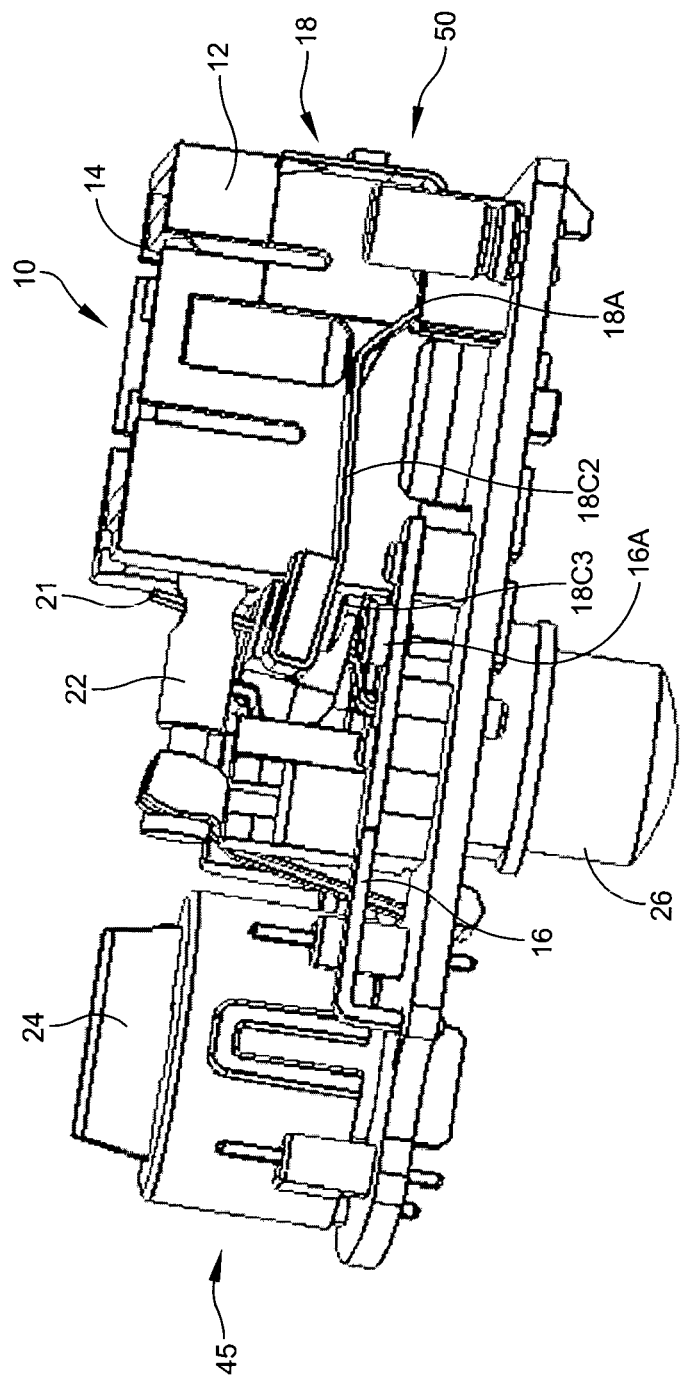
FIG. 4 shows a side view of an GFCI of FIG. 2 employing the principles of subject invention described herein.
Figure 5:
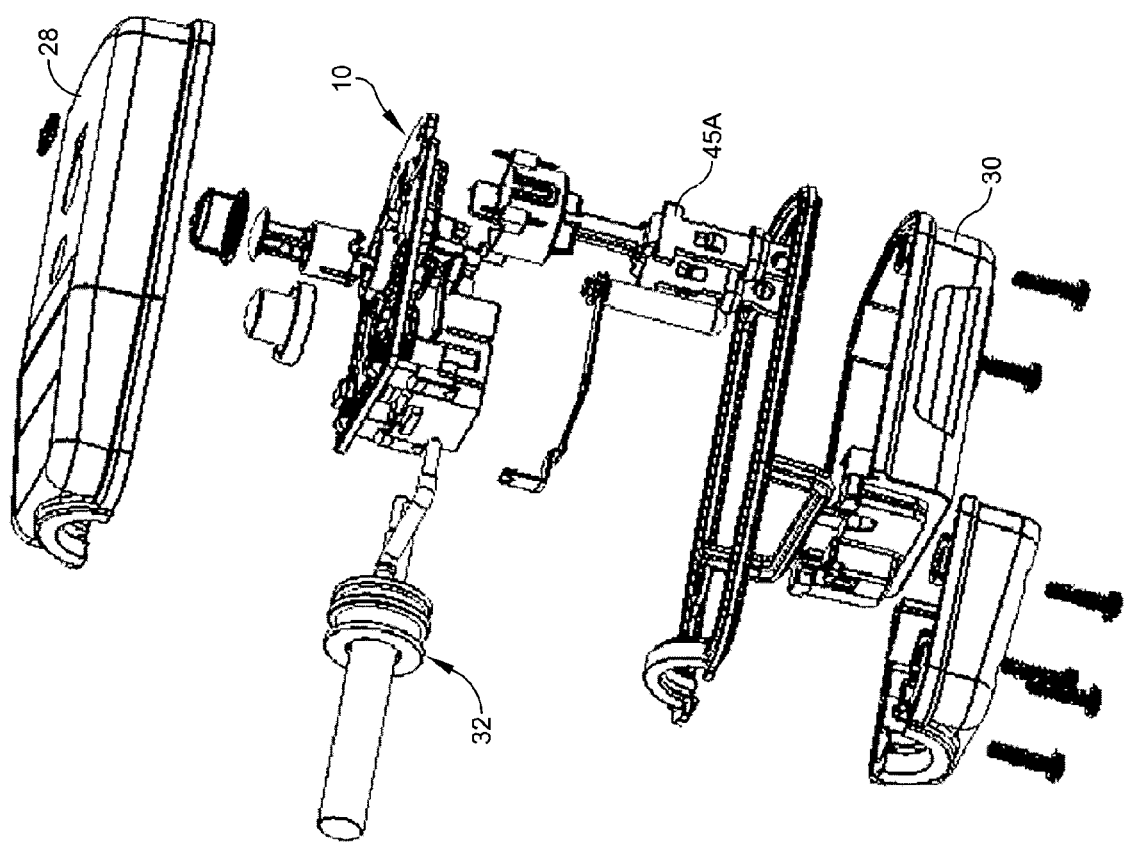
FIG. 5 illustrates an exploded view of the GFCI of the present invention as embodied in a GFCI Enclosure having a 90 degree male receptacle power source input contained in a single enclosure.
Figure 9:
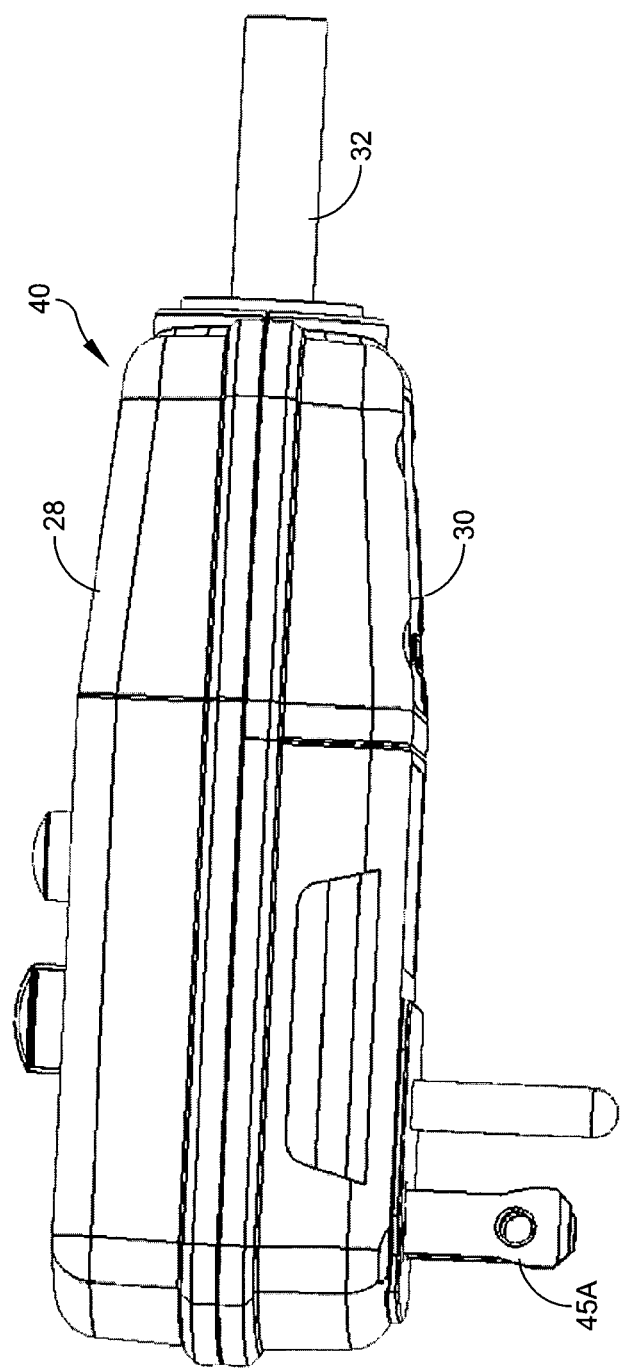
FIG. 9 illustrates an assembled GFCI enclosure of FIG. 5.

As illustrated in FIG. 2 and FIG. 4, GFCI PCB 10 includes a load input section 50 and a source power input section 45. As illustrated in FIGS. 5 and 9, a 90 degree source input plug is illustrated, however, any angular configuration plug, such as an in-line may be utilized with the GFCI PCB 10. Referring to FIG. 5 and FIG. 9, GFCI PCB may be housed in enclosure 40, the enclosure having a top 28 and bottom 30.

Figure 6:
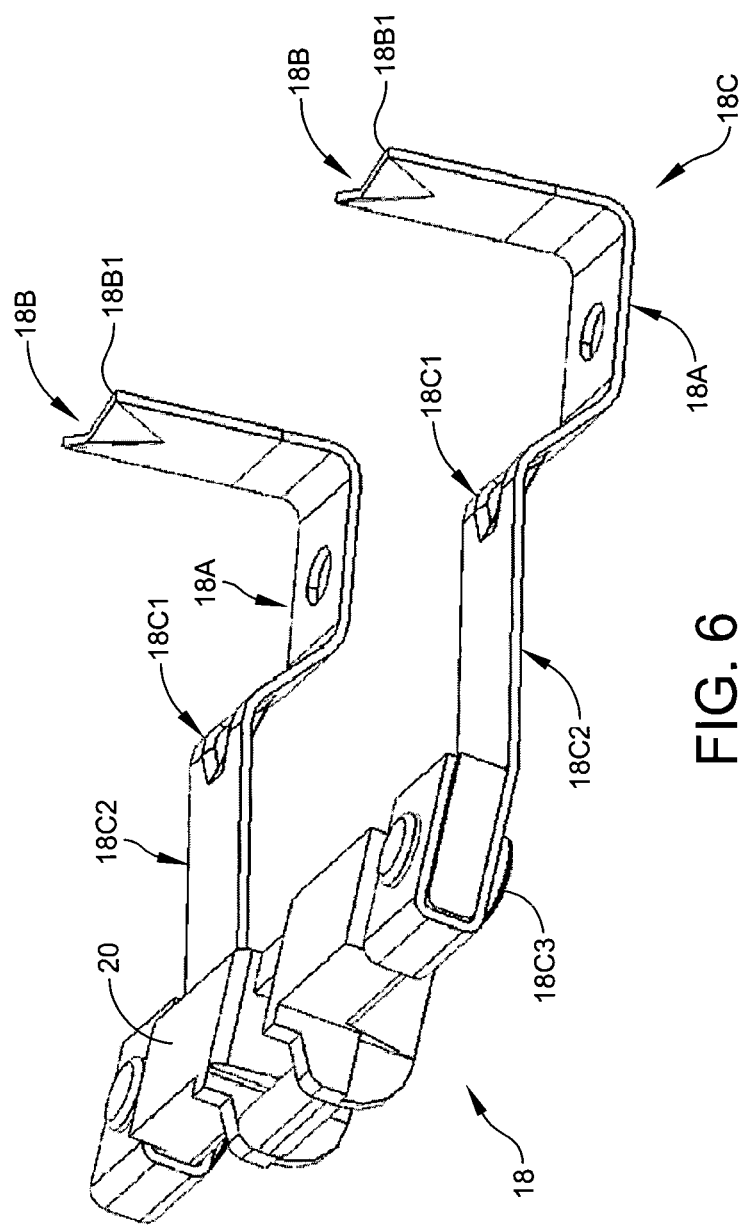
FIG. 6 illustrates the moveable contact arms utilized in subject invention including at one end a flexible projection utilized to secure a load input cable.

Referring to FIG. 4, the GFCI PCB 10 arrangement employs movable contact arms 18 that are mechanically biased to keep the contacts in a normally open position. Referring to FIG. 6, the contact arms 18 may take the form of a contact-carrying bar mounted in a cantilever fashion having flexible supporting legs 18C2 that provide the bias to a normally open position. In the preferred embodiment, and referring to FIG. 4, Flexible supporting, legs 18C2 are arranged adjacent to frame 12 of GFCI PCB 10, and anchored at point 18A. As illustrated in FIG. 4, Flexible Supporting legs 18C2 are resiliently flexible, and place contacts 18C3 in the normally open position.

Referring to FIG. 4, an elongated actuating member 21 is arranged to reciprocate adjacent the contact-carrying bar 20 when manually energized through an appropriate push button 26. When pushed, the actuating member 21 pushes the moveable contact arm ends 18C3 to engage stationary contact arms 16 thereby connecting the source of power 45 to the load 50.

Figure 7:
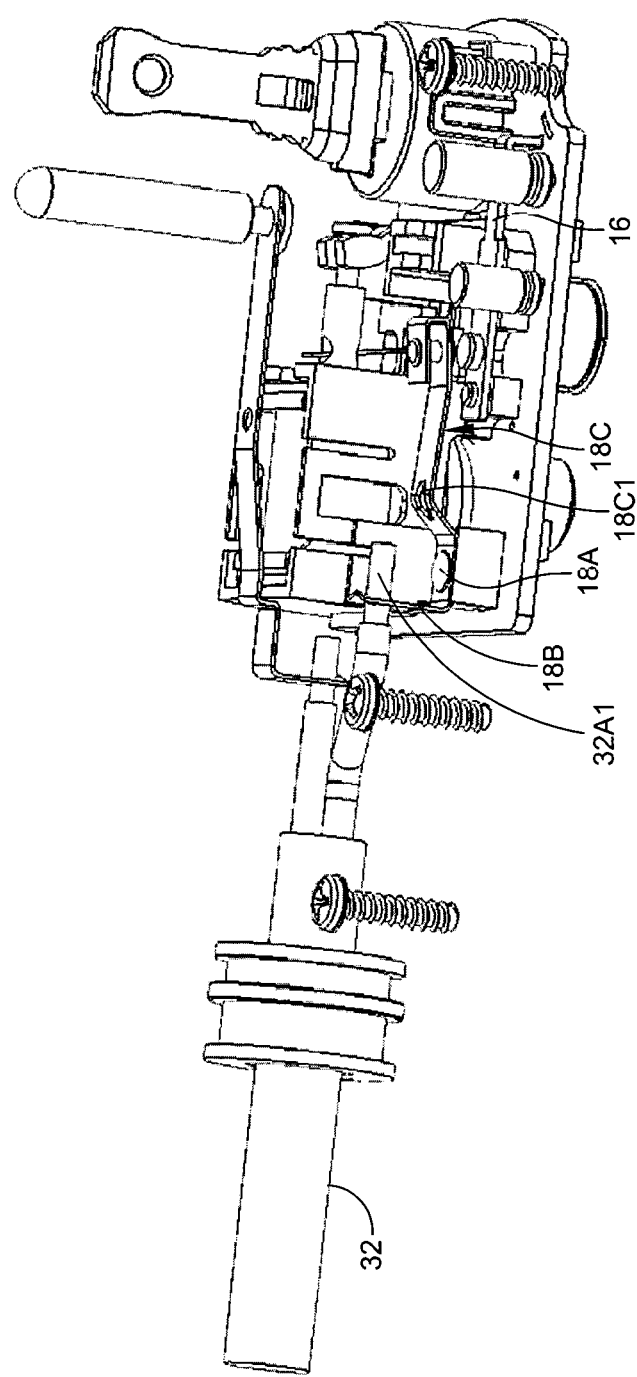
FIG. 7 illustrates a partial view of the GFCI of FIG. 2 showing the contact arm engagement with a load input cord.

Referring to FIG. 6, contact carrying bar 18C further includes an upward, resiliently flexible projection 18B and bend 18C1. As illustrated in FIG. 7, the quick connect feature of the present invention allows for the stripped end 32A1 of cord 32 to slideably engage flexible projection 18B causing projection 18B to flex downward. In the preferred embodiment, flexible projection 18B includes a grooved contact surface 18B1 to provide increased contact surface to stripped end 32A1. Stripped end 32A1 slideably engages grooved contact surface 18B1. From point 18A, legs 18C2 are raised to provide legs 18C2 with resilient flexibility.

Figure 8:
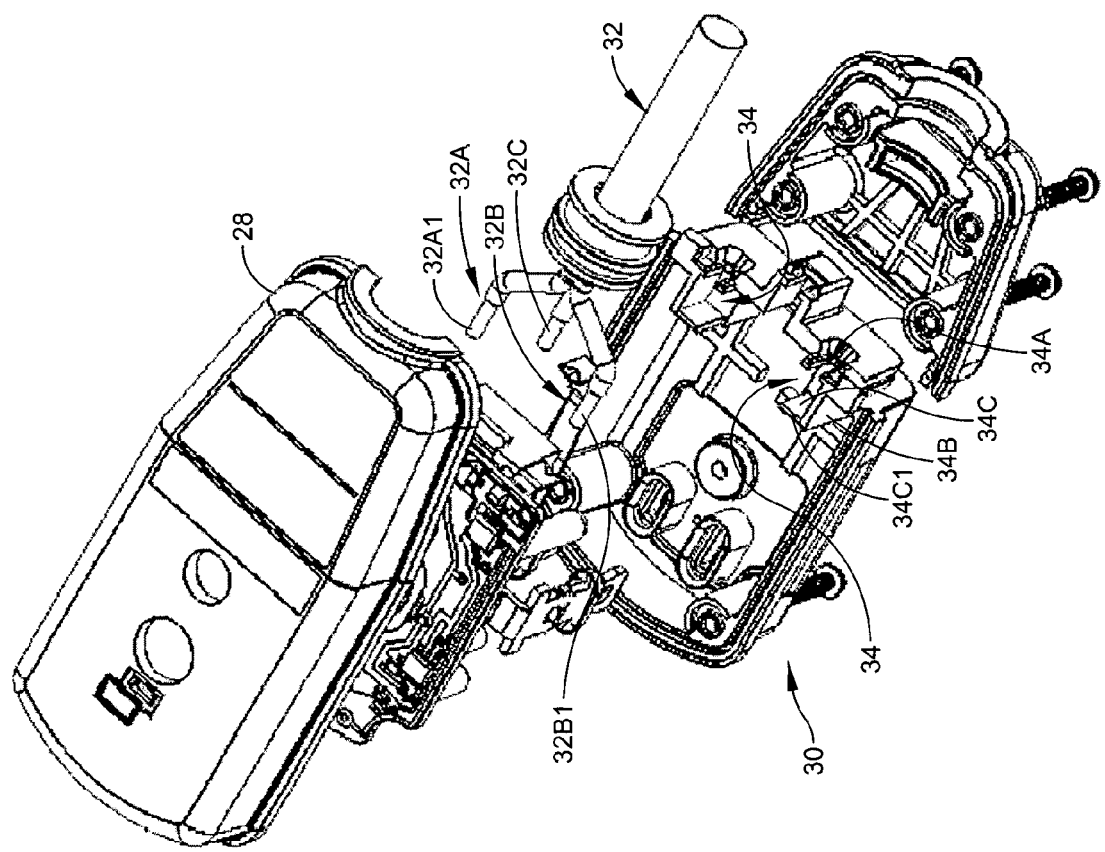
FIG. 8 illustrates an exploded view of the bottom housing of the GFCI enclosure of FIG. 5 showing the channels utilized for seating of the load input cord exposed ends.
Figure 10:
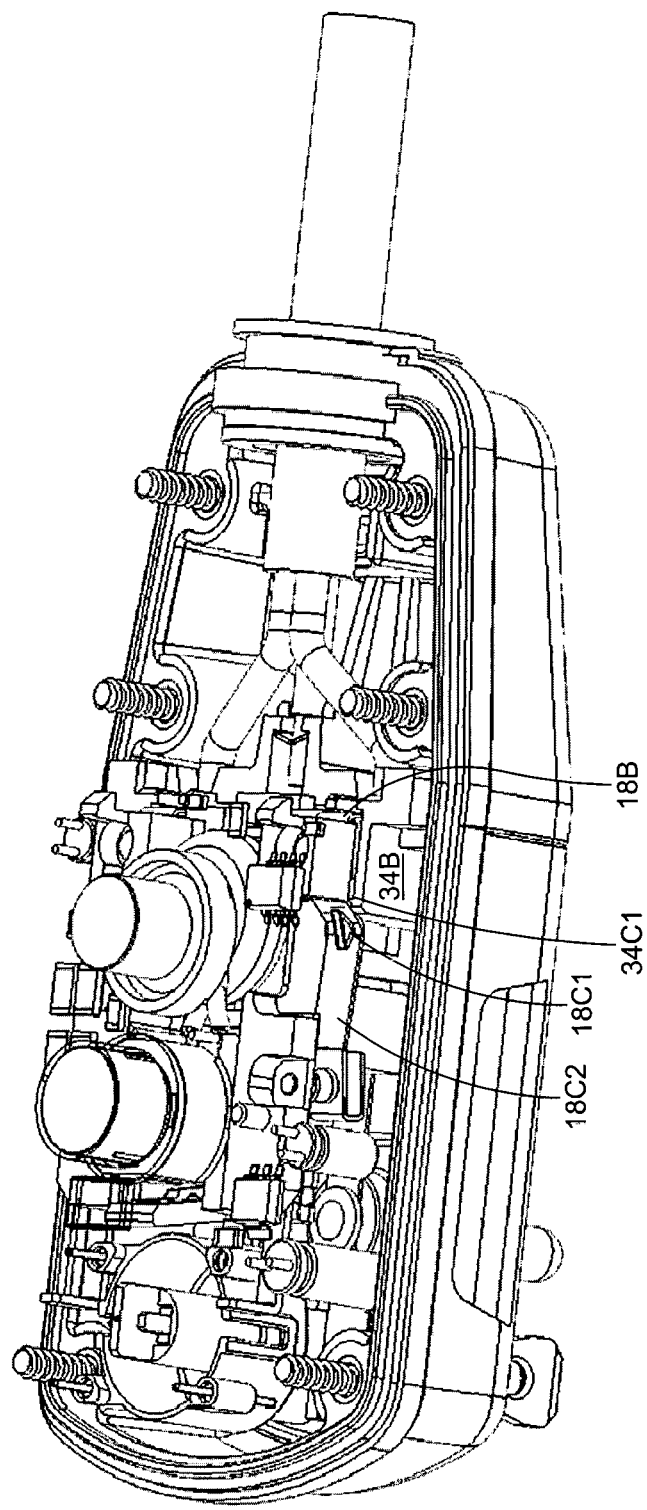
FIG. 10 illustrates a cross section of the assembled GFCI enclosure of FIG. 8.

Referring to FIG. 8 and FIG. 10, bottom housing 30 includes channels 34, which include sidewall 34B and backwall 34C, the backwall 34C including a top edge 34C1. Channels 34 encase flexible projection 18B, and bend 18C1 rests against top edge 34C1 to provide structural support to contact carrying bar 18C to elevate flexible supporting legs 18C2. When the components of FIG. 8 are assembled in enclosure 40 a load input cord 32 can be attached on site. As illustrated in FIGS. 7 and 8, when the stripped end 32A1 engages channel 34 of bottom housing 30, flexible projection 18B urges stripped end 32A downward against the bottom surface of channel 34 locking it in place. Grooved contact surface 18B1 further facilitates the locking in place of stripped end 32A1. Stripped end 32A1 engages channel 34 through quick connect holes 34A.

FIG. 10 illustrates a cross-section of the assembled GFCI enclosure of FIG. 8.

In the preferred embodiment, the strip requirements of conductive ends 32A1 are approximately ⅜ of an inch. Therefore in the preferred embodiment the length of channel 34, is approximately ⅜ of an inch to ensure conductive ends 32A1 are not exposed. In the preferred embodiment, cord 32 is an industry standard 18AWG cord.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. A ground fault circuit interrupter (GFCI) for quick connection of a load input cable, the load input cable having a plurality of terminal ends, comprising:
   a GFCI Circuit assembly, said GFCI circuit assembly being configured to detect at least one ground fault condition, said GFCI circuit assembly having a top, a bottom, a load input section and a source input section;
   said load input section comprising at one end a plurality of contacts adaptable for engagement with said source input section, and at the opposite end a plurality of cable securement jaws adaptable for securement of said plurality of load input cable terminal ends, wherein said plurality of cable securement jaws further comprises a plurality of cable securement frames having an opening for insertion of said plurality of load input cable terminal ends, said plurality of securement frames having a bottom wall, a side wall and a back wall, said back wall having a top edge,
   said load input section further comprising a contact carrying bar having at one end a resiliently flexible contact positioned within said plurality of cable securement frames, and at the opposite end a flexible supporting leg biased to a normally open position, the flexible supporting leg having at one end a bend and at the opposite end a contact, wherein said bend rests against said top edge of said back wall to bias said flexible supporting leg,
   said resiliently flexible contact flexing opposite said bottom wall upon engagement with said plurality of load input cable terminal ends, and urging said plurality of cable terminal ends against said bottom wall to secure said plurality of cable terminal ends within said plurality of cable securement frames.

2. A GFCI as in claim 1, further including a housing, said housing comprising a top, bottom, front and rear end, said housing adaptable to accept said GFCI circuit assembly therein, said bottom of said housing including said plurality of securement frames disposed therein.

3. A GFCI as in claim 1, wherein said GFCI circuit card assembly includes a solenoid positioned at one end of said circuit card assembly and a transformer positioned at the opposite end of said circuit card assembly, said circuit card assembly further including a plurality of resiliently flexible contact arms having at one end said plurality of cable securement jaws and at the opposite end said plurality of contacts adaptable for engagement to said source input section, said plurality of resiliently flexible contact arms positioned parallel to each other on opposite sides of said solenoid.

4. A GFCI as in claim 1, wherein said GFCI Circuit Assembly further includes:
   (a) a circuit breaker having a switch located in one of said lines, said switch having a first position in which the source of power in its associated line is not connected to the load and a second position in which the source of power in its associated line is connected to the load;
   (b) a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state;
   (c) a booster circuit for selectively supplying a first voltage to the solenoid sufficient to cause said solenoid to switch from its de-energized state to its energized state, said first voltage being supplied to said solenoid through said switch when said switch is in its second position;
   (d) a latch circuit operable in first and second bi-stable states, said latch circuit allowing said solenoid to switch from its de-energized state to its energized state and remain in its energized state when in said first bi-stable state and said latch circuit causing said solenoid to switch from its energized state to its de-energized state and remain in its de-energized state when in said second bi-stable state; and
   (e) a fault detecting circuit for detecting the presence of a fault condition in at least one of said lines extending between the power and the load and for causing said latch circuit to latch in its second bi-stable state upon detection of said fault condition.

5. The GFCI of claim 4 wherein the switch in said circuit breaker is normally in said first position.

6. The GFCI of claim 4 wherein said second position of said switch occurs after a manual reset.

7. The GFCI of claim 4 wherein said relay circuit further includes means coupled to said solenoid for selectively controlling the operation of said solenoid.

8. The GFCI of claim 7 wherein said means for selectively controlling the operation of said solenoid is a silicon rectifier.

9. The GFCI of claim 4 further including a reset switch for manually resetting said latch circuit into said first bi-stable state after it has been placed in said second bi-stable state by said fault detecting circuit.

10. The GFCI of claim 4 wherein said latch circuit comprises a silicon controlled rectifier which is non-conducting when said latch circuit is in its first state and is conducting when said electronic latch circuit is in its second state, said fault detecting circuit causing said rectifier to turn on when said fault detecting circuit detects said fault condition.

11. The GFCI of claim 10 wherein said SCR has a gate drive requirement of less than 200 uf.

* * * * *